United States Patent

[11] 3,599,261

| [72] | Inventor | Artur Fohl |
| | | Haubersbronn, Germany |
| [21] | Appl. No. | 753,615 |
| [22] | Filed | Aug. 19, 1968 |
| [45] | Patented | Aug. 17, 1971 |
| [73] | Assignee | Rems-Werk Christian Foll & Sohne |
| | | Waiblingen, Germany |

[54] APPARATUS FOR MACHINING PIPES AND THE LIKE
4 Claims, 5 Drawing Figs.

[52] U.S. Cl. .............................................. 10/107, 10/87, 82/42
[51] Int. Cl. ................................................. B23g 1/00
[50] Field of Search.......................................... 10/87, 89, 90, 107; 77/73; 82/42; 279/106

[56] References Cited
UNITED STATES PATENTS

| 2,768,550 | 10/1956 | Ingwer et al. | 77/73 |
| 2,962,920 | 12/1960 | Wallace | 77/73 |
| 2,980,434 | 4/1961 | Hoffman | 279/106 |
| 2,985,458 | 5/1961 | Everett | 279/106 |
| 3,005,638 | 10/1961 | McConnell | 279/106 |
| 3,016,245 | 1/1962 | VonZelewsky | 279/106 |
| 3,270,592 | 9/1966 | Behnke | 279/106 |
| 3,413,667 | 12/1968 | Behnke | 10/107 |

Primary Examiner—Charles W. Lanham
Assistant Examiner—E. M. Combs
Attorney—Walter Becker ABSTRACT: An apparatus for clamping and rotating workpieces such as pipes and for performing machining operations, such as pipes, in which the workpiece is clamped by devices which have clamp levers pivoted at their outer ends to a rotary housing and have their inner workpiece engaging ends inclined and in which the machining operation for cutting threads is carried out by cutting elements moveable radially on a support therefor. The cutting elements are spring biased toward retracted position and are held in cutting position by a stop element which is adapted to be moved to ineffective position by movement of a member which is engaged and moved by the end of a workpiece machined.

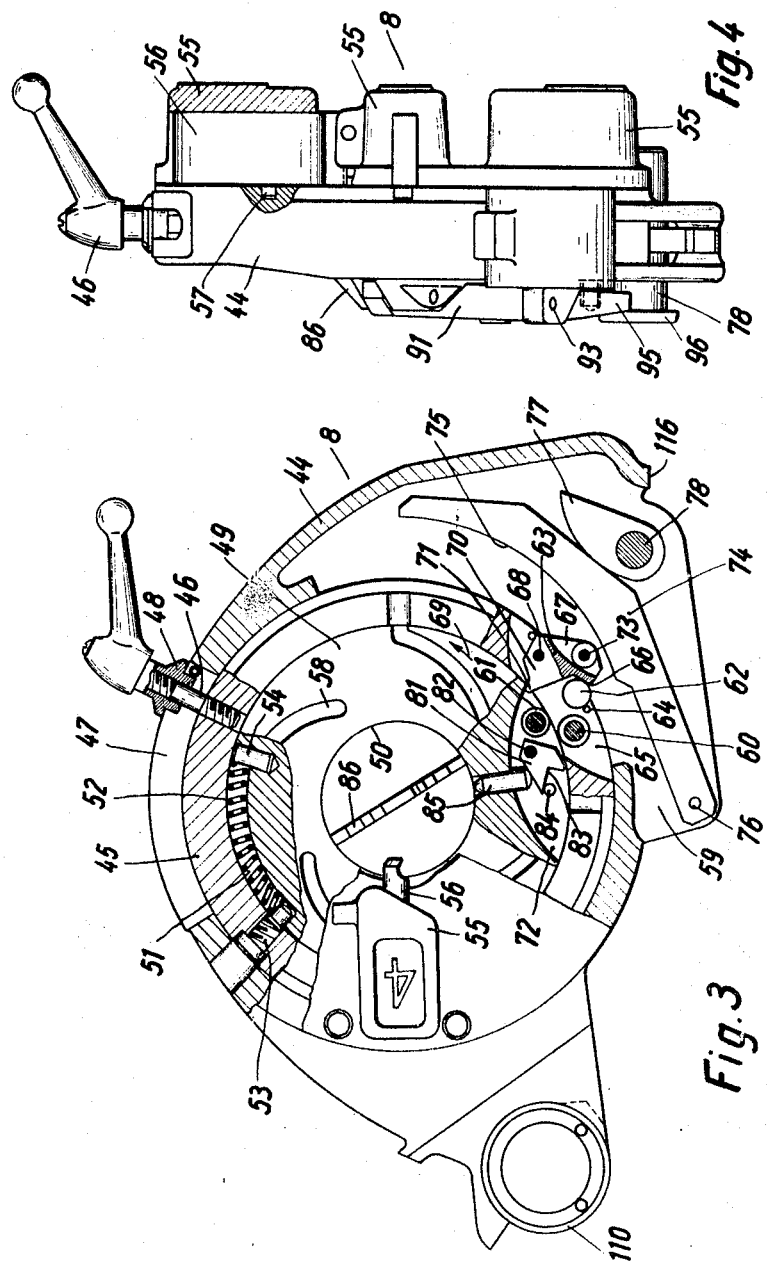

Inventor:
Artur Föhl

APPARATUS FOR MACHINING PIPES AND THE LIKE

The present invention concerns an apparatus for machining pipes and the like, as for instance for thread cutting, deburring, or cutting off, with a threading die head which is displaceable on frame means while the thread-cutting tools of said apparatus are movable in a direction transverse to their direction of rotation and in their end position toward their axis of rotation are adapted to be locked by means of arresting devices. The apparatus is furthermore provided with a workpiece-chucking device located at one side of the threading die head, said chucking device comprising in particular three clamping or chucking jaws pivotally supported by a carrier while the curved clamping surfaces of said clamping jaws are located eccentrically with regard to the pivot axis. The curved clamping surfaces are each provided with a recess engaged by a pin or the like of a control member which is movable relative to said carrier in a direction transverse to said recess.

Heretofore known devices of the type involved have the clamping jaws of the workpiece-chucking device designed as two-arm levers. One of said arms comprises the clamping surface while the other arm has the recess for engagement by the pin of the control member. As a result of this design, the heretofore known workpiece-chucking or clamping devices have unduly large dimensions which makes them complicated in structure.

It is an object of the present invention to provide an apparatus of the above mentioned general type which will be simple in construction and furthermore assure a safe and precise machining of pipes and the like.

It is another object of this invention to provide an apparatus as set forth in the preceding paragraph, in which the workpiece-clamping device while having small dimensions will assure a firm clamping or chucking of the pipes to be machined.

These and other objects and advantages of the invention will appear more clearly from the following specification in connection with the accompanying drawings, in which:

FIG. 3 illustrates a modified threading die head according to the invention as seen from the right with regard to FIG. 1.

FIG. 4 shows the threading die head of FIG. 3 as seen from the left thereof.

Figure 1:
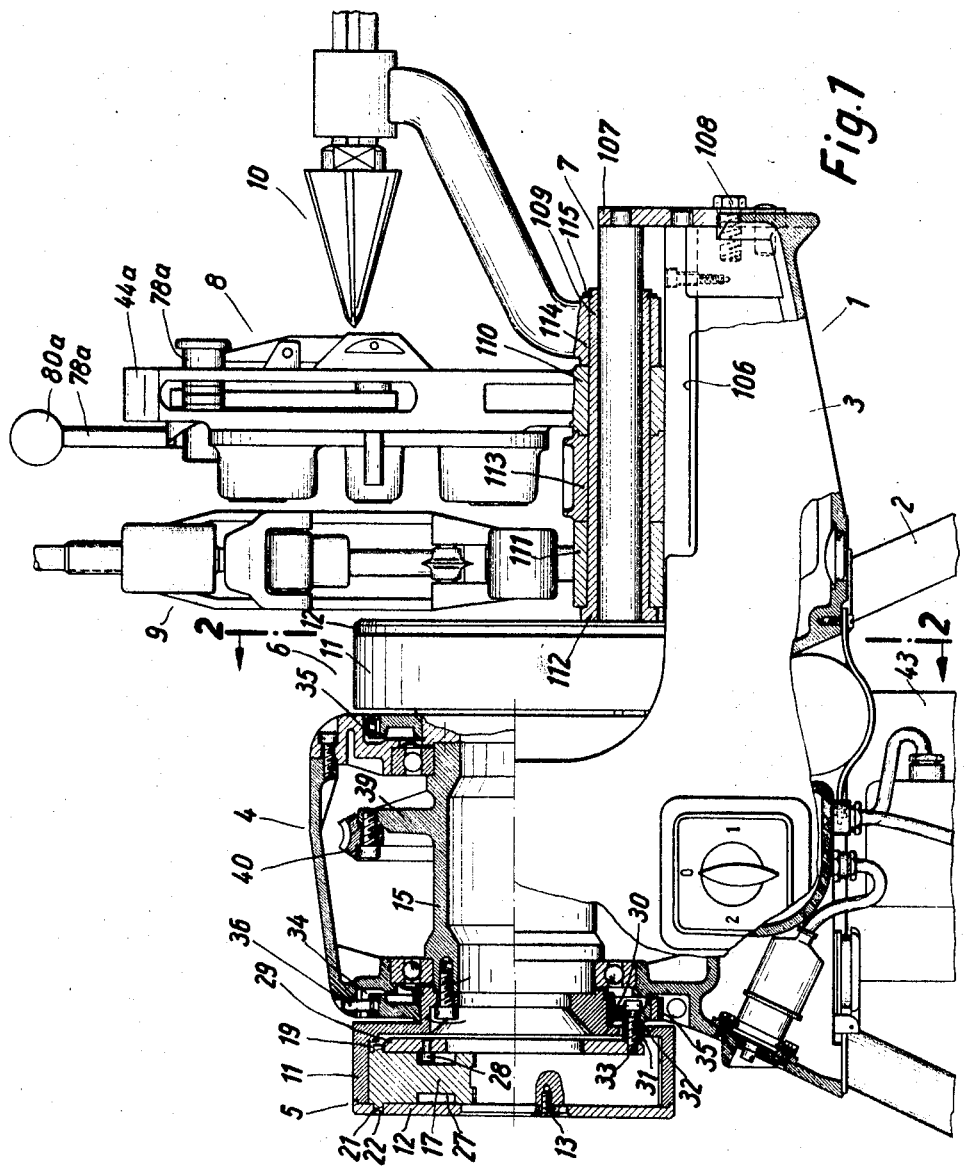
FIG. 1 illustrates partially in side view and partially in section an apparatus according to the invention.

A workpiece-chucking or clamping device according to the present invention for machining pipes and the like is characterized primarily in that the clamping jaws form one-arm levers and that the recesses to be engaged by a pin or the like of the control member are located between the pivot axis and the clamping surface. This arrangement greatly reduces the dimensions of the workpiece-clamping device according to the invention while assuring a safe operation thereof.

In order to permit a high clamping force in spite of the relatively weak dimensioning of the apparatus, each clamping jaw is supported by a cup of the carrier by means of a corresponding pin-shaped extension or the like, said cup being located opposite to the clamping surface of the respective clamping jaw and preferably being of a semicircular contour. In order, when turning the control member by a relatively small angle, to obtain a relatively great feeding movement of the clamping jaws, the recesses in said clamping jaws are so designed that they extend approximately radially with regard to the pivot axes in longitudinal direction. It is also possible to provide the recesses on the control member in which instance the clamping jaws are provided with pins or the like extending into said recesses. Furthermore, the control member may be connected to the clamping jaws through simple levers or linkage means, as for instance elbow levers, in such a way that the clamping jaws will carry out a pivoting movement in response to a turning movement of the control member.

In order after initiating the turning movement of the workpiece-clamping device to assure that the clamping jaws are firmly engaging the workpiece, the control disc is connected to an adjustable friction brake preferably in the form of a band brake, which extends around a cylindrical portion protruding from the drum and pertaining to the control disc and bringing about a relative movement of the control disc with regard to the carrier for the clamping jaws until the clamping surfaces of the clamping jaws engage the circumference of the workpiece. Inasmuch as the clamping surfaces of the clamping jaws are located eccentrically with regard to the pivot axes thereof, the clamping force of the workpiece-clamping device automatically increases with increasing torque acting upon the workpiece.

According to a further development of the invention, two axially spaced clamping devices are provided having their clamping jaws movable independent of each other so that the workpiece can safely and in a play-free manner be chucked. Inasmuch as the clamping jaws of the two clamping devices are movable independently of each other, a firm hold of the workpiece within the range of each workpiece-clamping device will be assured without running the risk that the circumferential surface of the workpiece will be damaged, inasmuch as the clamping force is distributed over two clamping areas. Expediently, the clamping devices are arranged at the ends of a hollow shaft supported by bearing means. The hollow shaft is within said bearing means drivingly connected to a motor preferably through a worm drive by means of which the workpiece-clamping device with the clamped workpiece is rotated. It is also possible, instead of the workpiece-clamping device, to rotatably journal the threading die head and to connect the same with a drive.

The threading die head of the above-mentioned type of the device for machining pipes or the like has a control disc which is tiltable relative to a cutting jaw holder and can be arrested by means of an arresting device. The said control disc is provided with recesses extending transverse to the circumferential direction thereof for engagement with pins or the like of the cutting jaws which are displaceable approximately radially. According to a further development of the present invention, such threading die head is so designed that a safe arresting of the control disc in cutting position will be assured. The present invention furthermore makes it possible that after a predetermined machining stroke, i.e. after a predetermined length of the thread has been obtained, the cutting jaws move automatically outwardly so that their engagement with the workpiece will be interrupted. This interruption of the cutting operation may be effected selectively by hand. The arresting device according to the invention is of a simple construction.

With a threading die head of the above-mentioned type the invention provides that the control disc and the member supporting the same have an abutment, and furthermore provides that between the abutments a spacer member is movable by means of a control member which is located between the abutments of a releasing member which is movable transverse to the axial direction of the control disc and movably journaled thereon. The said releasing member has a feeler member by means of which it engages a control surface of an abutment for the workpiece, said abutment being displaceable with regard to the control disc. In view of the spacer member movable between the abutments, the cutting position of the control disc and thus of the cutting jaws is precisely determined. When the workpiece which during the thread cutting operation carries out an advancing movement abuts the above-mentioned abutment, the latter is carried along by the workpiece so that the feeler member is actuated and the releasing member is moved in its direction of movement. The releasing member then removes the spacer member from between the two abutments so that the control disc and the members supporting the same can be rotated relative to each other in such a way that the cutting jaws are moved away from each other and disengage the workpiece. After the said abutment has once been adjusted, i.e. threads with respectively the same length can be cut without a particular manual operation for stopping the thread cutting operation after the said thread length has been obtained. Expediently, the control disc and the parts supporting the same are preferably resiliently interconnected by screw pressure acting in circumferential direction in such a way that the control disc in response to a relief of the spring is rotated relative to the control disc supporting part in such a way that the cutting jaws are moved away from each other.

The relief member of the arresting device according to the invention may in a simple manner be formed by a tiltable lever which is preferably movable between abutments and one side of which faces the spacer member located between the abutments while the other side thereof faces the feeler pin. In this way the construction of the threading die head can be simple while the relief member can move the spacer member in a simple manner out of its position between the two abutments of the arresting device.

According to a further development of the invention, the abutment for the support of the feeler pin has a circumferential surface which is inclined to the axial direction and the mantle lines of which converge to that side which faces away from the oncoming side. Thus, the feeler pin may in a simple manner be displaceably arranged so as to be able to move radially to the axially displaceable abutment in the control disc.

It has been found advantageous to form the abutments for the spacer member by rollers so that the spacer members during its movement between the abutments and during the oppositely directed movement will not be exposed to too great a friction. The construction of the arresting device may furthermore be simplified by forming the spacer member by a part, preferably a cylinder member, which is freely movable in a cage. The axis of this movable member is, when located between the abutments, arranged along a straight line with the axes thereof. The spacer member may, however, also be formed by a portion of a tiltably pivotally connected lever which may be linked either to the control disc or to the support therefor. Furthermore, it is possible displaceably to guide the spacer member in positive guiding means on one of the said two parts.

According to a further suggestion in conformity with the present invention, the control member is formed by a lever which is pivotally connected to the support for the control disc which forms one side of a cage for the spacer member while the section which faces the support for the spacer member is tiltable toward the abutments. By tilting this lever, the spacer member is moved between the abutments.

According to a preferred embodiment of the invention, the control lever and one abutment are mounted on one adjusting ring which in its turn is tiltably and arrestably mounted in the housing which houses the support for the cutting jaws. Preferably, the said adjusting ring is tiltable in conformity with a scale so that the cutting position of the control disc can be adjusted relative to the cutting jaws.

For purposes of actuating the control lever, within the range of the latter and preferably at the outside thereof, there is mounted a lever which is movable toward the control lever which latter is journaled on a fixed part, preferably the housing, so as to be movable relative thereto. The said fixed part is preferably provided with a curved abutment surface for the control lever which surface is curved approximately coaxially with regard to the cutting head axis and is provided with a handle. By means of this lever, the control lever may be actuated in a simple manner at any relative position of the control disc with regard to the housing.

In order to facilitate the introduction of the spacer member between the abutments associated therewith, the preferably two-arm control lever is provided with a follower which in the tilting direction of the control disc, for purposes of opening the cutting head, is located behind a corresponding abutment surface of the control disc. When the control lever is tilted, it first takes along the control disc by direct engagement of the follower in the corresponding direction of rotation until during the end phase of this movement the spacer member is pressed between the abutments. In view of their cylindrical circumferential surfaces, the said abutments form a funnel-shaped opening for the spacer member and therefore are under the pressure of the spacer member pressed away from each other. Advantageously, the follower is provided on that arm of the control lever which is located opposite the supporting area for the spacer member.

For purposes of moving the lever provided for the actuation of the control lever, that side of said lever which faces away from the control lever has arranged thereon a cam of an actuating shaft provided with a handle, said last-mentioned shaft being journaled in the housing. In this way by a simple turning of the actuating shaft by means of the handle, the control lever is tilted for moving the spacer member.

The operation of the threading die head is very simple when the actuating shaft which is approximately axis-parallel to the abutment for the oncoming movement, is displaceable axially and through a linkage is connected to the last-mentioned abutment. This makes it possible by an axial movement of the actuating shaft to move the said abutment axially whereby, as described above, the spacer member is removed from between the abutments so that the cutting jaws will automatically be moved away from each other.

It is also possible by means of one and the same handle to move the cutting jaws into cutting position and also to their other end position. Advantageously, the handle is tiltable about an axis which is transverse to the actuating shaft and is linked to the actuating shaft while a counter bearing fixedly connected to the housing is located between the linkage point and the handle.

In order to assure a safe mounting of the axially displaceable tool holder while preserving a simple construction of the device, the apparatus according to the present invention is so designed that at least one tool holder, preferably the threading die head, the pipe cutter and the deburrer are at one hand guided on a positive guiding means and on the other hand are guided on a substantially plane sliding surface. In this way, without special steps, tolerances can be compensated for while furthermore an easy displaceability of the tool holder will be assured.

The positive guiding means may, in a simple manner, be formed by a preferably horizontal cylindrical linkage.

In order to be able easily to remove the individual tool holders or to arrange and exchange the same, the tool holders are detachable mounted on a sleeve displaceable on the cylinder rod.

Referring now to the drawings in detail, a device according to the present invention comprises a frame 1 mounted on detachably inserted pipe legs 2 in straddled position and carrying the support 3 which is preferably a cast body.

One side of the support 3 forms a bearing housing 4 for two workpiece-clamping devices in the form of chucks, said clamping devices being arranged coaxially with regard to each other at both end faces of the bearing housing 4. The other side of the support 3 comprises guiding means 7 for a threading die head 8 which guiding means extend parallel to the axial direction of the chucks 5, 6. The said other side of said support 3 furthermore comprises a pipe-cutting device 9 on one side of said head 8 and a deburring device 10 on the other side of said head 8.

Figure 2:
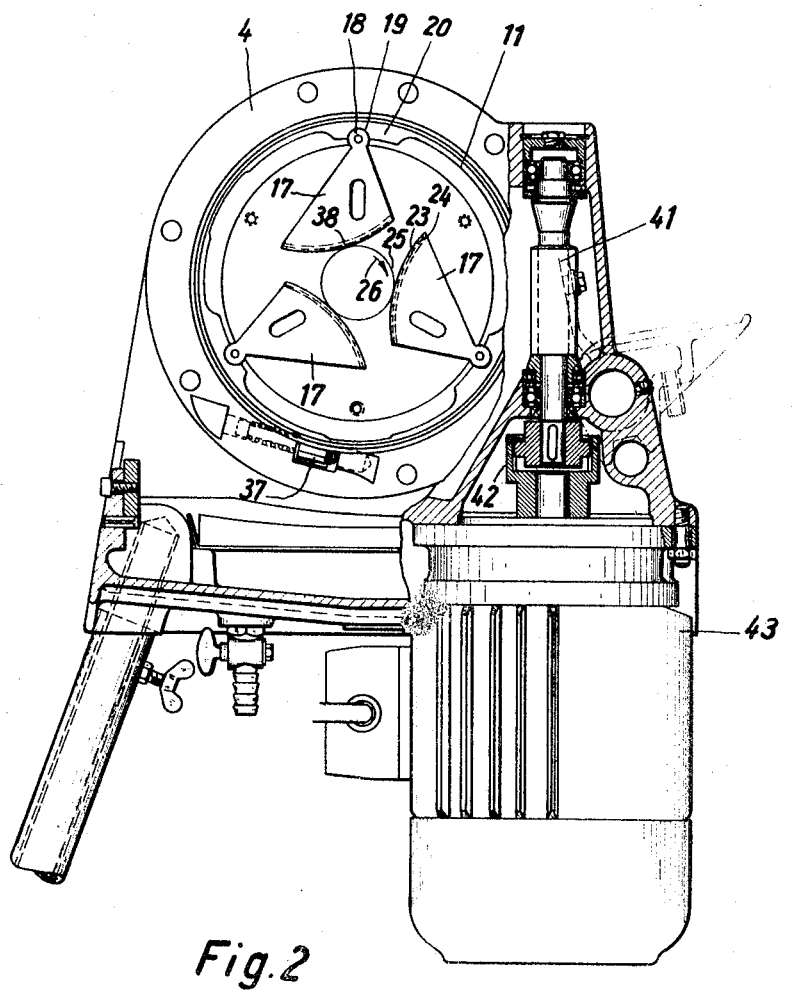
FIG. 2 is a cross section through FIG. 1 along the line II–II thereof.

The two chucks 5, 6 are of identical construction. As shown in FIGS. 1 and 2, each chuck 5, 6 comprises a drum 11 which has that end face thereof which faces away from the bearing housing 4 closed by a disc-shaped cover 12 connected to said drum 11 by means of screws 13. Drum 11 together with the cover 12 forms a housing which is substantially closed on all sides and the end faces of which have passages for the workpiece to be machined. Drum 11 is provided with a sleeve-shaped extension 14 which is guided in the housing 4 and by means of screws 16 is connected to a hollow shaft 15 journaled in the bearing housing 4.

Arranged in drum 11 are three chucks 17 which are uniformly distributed over the circumference of said drum and are designed in the form of one-arm levers while being pivotable about axes parallel to the drum 11. To this end, each chuck 17 has a pivotlike extension 18 supported on the inside of drum 11 by a bearing cup 19 of semicircular cross section. The bearing cups 19 are provided on protruding reinforced areas of the inner surface of drum 11. Both end faces of the cylindrical pivot 18 of each chuck 17 have a protruding pinlike centering extension 21. These centering extensions 21 are journaled with play in corresponding centering recesses 22 on the cover 12 of the drum and/or on the side opposite to cover 12 in such a way that the stud or pivot 18 of each chuck 17 will be able over its entire surface to rest in the respective bearing cup 19 pertaining thereto. On that side which is opposite the stud 18, each chuck 17 is provided with a curved clamping surface 23 which is eccentrically located with regard to the pivot axis of the respective chuck 17 and which may be formed by a saw tooth-shaped gear ring 24. When the chucks 17 with their clamping surfaces 23 engage the circumference of a workpiece 25 indicated in FIG. 2 and inserted into the chucks 5, 6, and if this workpiece 25 is under a load in the direction of rotation indicated by the arrow 26, the chucks 17 will with increasing torque be pressed at a higher pressure against the circumference of the workpiece 25 so that the workpiece 25 will be safely held while the chucks 17 rest in the bearing cups 19. If the direction in which the load acts upon the workpiece is opposite to the direction of the arrow 26, it is merely necessary after loosening of the cover 12 of drum 11 to withdraw the chucks 17 from the bearing cups 19 and to insert the same reversed so that the same effect will occur as it occurred previously when the load acted in the direction of the arrow 26.

The chucks 17, which are arranged entirely within the drum 11 closed at it circumference, have each of their side surfaces provided with an oval groovelike recess 27 which extends radially with regard to the pivot axis of the respective chuck 17. The said recess 27 is arranged between the clamping surface 23 and the stud or pivot 18 of the respective chuck pertaining thereto. The recess 27 of each chuck 17, which recess faces away from the cover 12, is engaged with play by a pin 28 of a control disc 29 located coaxially with regard to and in said drum 11. The disc 29 may in a simple manner be mounted on the drum. The three pins 29 associated with the chucks 17 are uniformly distributed over the circumference of the control disc 29. The control disc 29 directly engages those side surfaces of the chucks 17 which face away from the drum cover 12. The control disc 29 is connected to a brake disc 30 which is rotatably journaled outside the drum 11 on a sleevelike extension 14 of the drum and is prevented from axial displacement. To this end, the brake disc 30 is provided with bolt-shaped members 31 which extend through slot-shaped semicircular recesses 32 in the end face of the drum, the control disc 29 being drawn against the end faces of said bolts 21 by screws 33. The brake disc 30 is located in a corresponding recess 34 at the end face of the bearing housing 4 so that it is protected. The circumference of the brake disc 30 is engaged by a brake band 35 provided with a corresponding lining. The brake band 35 is by means of a bolt 36 in the bearing housing 4 secured against rotation while both ends of said brake band are adapted to be tensioned by a screw 37 extending tangentially with regard to the disc 30 and held on the bearing housing 4 in such a way that the friction can be adjusted at which the brake band 35 engages the brake disc 30.

When the chucks 5, 6 are turned relative to the bearing housing 4 in a direction opposite to the direction of the arrow 26, the control disc 29 braked by the bank 35 will first not rotate so that the bolts 28 carry out a relative movement with regard to drum 11. In view of this relative movement, the chucks 17 are moved toward the workpiece 25 until they engage the circumference of said workpiece. As soon as the chucks 17 by means of their clamping surfaces 23 engage the workpiece 25, the control disc 29 is turned against the force of the brake band 35. When this occurs, the chucks 17 will, as described above, with increasing torque press against the circumference of the workpiece with increasing pressure. The clamping surfaces 23 of the chucks 17 are in these circumstances engaging the circumferential surface of the workpiece 25 in such a way that a kind of elbow lever is formed the elbow joint of which is represented by the supporting area 38.

Since the clamping jaws or chucks 17 of the two chucks 5, 6 are movable independently of each other, the workpiece guided by the two chucks 5, 6 is safely held at two areas.

The hollow shaft 15 which has both ends journaled in friction bearings is within the bearing housing 4 provided with a disc-shaped flange 39 the outer side of which has fixedly screwed thereto a worm wheel 40. A worm 41 meshes with the worm wheel 40, said worm 41 being rotatably journaled about a vertical axis adjacent the bearing housing 4. Worm 41 is drivingly connected through an elastic plug clutch 42 with a flanged electric motor 43 which is located below said clutch 42 and is arranged at one side of the support 3. By means of motor 43 the chucks 5, 6 are rotated in the manner described above.

Figure 5:
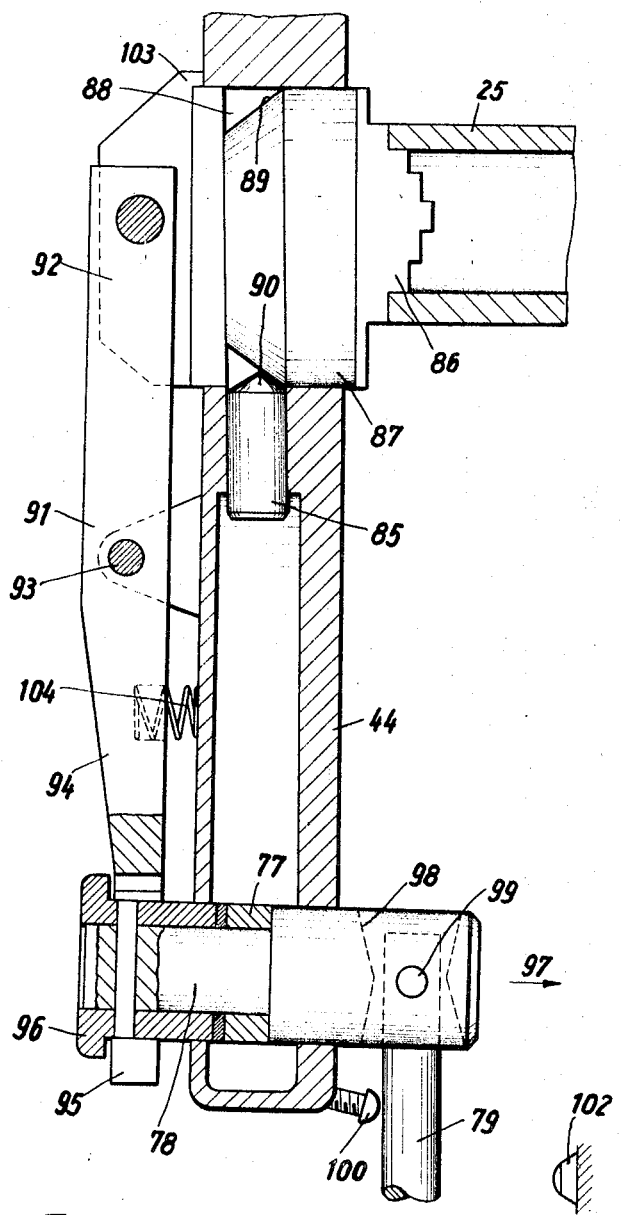
FIG. 5 shows a cutout of the threading die head according to FIG. 4 in section and in pivoted illustration.

FIGS. 3—5 illustrate the thread cutting device 8 of the apparatus according to FIG. 1. This thread cutting device 8 comprises a housing 44 having pivotally mounted therein a bearing ring 45 which is coaxially arranged with regard to the chucks 5 and 6 and which is adapted to be arrested by means of a tommy screw 46. To this end, the housing 44 in the embodiment shown in FIGS. 3 and 4 has its top side provided with a slotlike recess 47. The tommy screw 46 which threadedly engages the bearing ring 45 rests through the intervention of a corresponding sleeve 48 on the marginal areas of the recess 47. The marginal zone of slot 47 may be provided with a scale for facilitating the adjustment of the bearing ring 45. A control disc 49 is rotatably journaled in the bearing ring 45, said control disc being provided with a passage 50. The top side of the control disc 49 is at the circumference provided with a semicircular groove-shaped recess 51 for receiving a pressure spring 52. One end of pressure spring 52 rests on a bolt 53 in the bearing ring 45 whereas the other end of said spring 52 rests on a bolt 54 in the control disc 49.

Cutting jaw holders 55 are provided at that end face of the housing 4 which faces the chucks 5, 6. These cutting jaw holders 55, preferably four, are uniformly distributed over the circumference and form radial sliding guides for the cutting jaws 56 respectively. The cutting jaws 56 by means of a pin 57 extend through corresponding recesses or cutouts in the end wall of the housing 4 and are guided in grooves 58 at the corresponding end face of the control disc 49. The three grooves 58 of the control disc 49 partially follow a spiral transverse to the circumferential direction of the control disc 49 and curved toward the center thereof in such a way that the inner ends of the grooves 48 point in a direction opposite to the direction of the pull exerted by the springs 52 upon the control disc 49. When the control disc 49 is turned relative to the housing 44, the cutting jaws 56, which are guided by pins 57 in the grooves 58 of the control disc 49, carry out a radial movement.

The bearing ring 45 and the control disc 49 may in the cutting position of the cutting jaws 56 be arrested relative to each other by an arresting device 59. This arresting device 59 has a rotatably journaled abutment roller 60 on the bearing ring 45 and an abutment roller 61 on the control disc 49. The innermost mantle line of the abutment roller 60 of the bearing ring 45, which mantle line points toward the central axis of the threading die head, is located approximately on the same sweep circle as the outermost mantle line of the abutment roller 61 of the control disc 49, the arrangement being such that these two rollers 60, 61 can just be moved past each other when the disc 49 is turned toward the bearing ring 45. The bearing ring 45 has a cage for a spacer member 62 formed by a cylindrical member. This cage is radially formed by a two-arm lever 63 and a pin 64 and at the sides perpendicular thereto is formed by the walls of a cut 65 at the circumference of the bearing ring 45. In its starting position, the spacer member 62 engages a supporting surface 66 of one arm 67 of the two-arm lever 63. When the lever 63, which is pivotable in the cut 65 of the bearing ring 45 about a pivot 68, is with its arm 67 pivoted toward the control disc 59, the spacer member 62 is moved toward the two abutment rollers 60, 61 in such a way that it is centered between said two rollers. When continuing the tilting movement of lever 63, the spacer member 62 is moved between the abutment rollers 60, 61 which move away from each other, until its central axis is in alignment with the central axes of the abutment rollers 60, 61. For purposes of moving the abutment rollers 60, 61 away from each other, it is merely necessary to turn the control disc 49 relative to the housing 44 in the direction of the arrow 69 in such a way that the pins 57 of the cutting jaws 56 move into radially further inwardly located areas of the grooves 58 of the control disc 49 and thus the cutting jaws move to their cutting position. In this cutting position, the cutting jaws 56 are then held by spacer member 62 which is located between the abutment rollers 60, 61. For purposes of facilitating the introduction of the spacer member 62 between the abutment rollers 60, 61, the other arm 70 of the two-arm control lever 63 is provided with a follower 71 in the path of movement of which there is located one marginal area of a cut 72 at the circumference of the control disc 49 in which cut the abutment roller 61 is journaled. When tilting the control lever 63 in the opposite direction, the follower 71 first moves the control disc 49 in the direction of the arrow 69 until the spacer member 62 engages the already partially moved apart abutment rollers 60, 61 whereupon the remaining tilting movement of the control disc 49 in the direction of the arrow 69 is effected by pressing the spacer member 62 between the rollers 60, 61. In this condition, the follower 71 no longer engages the control disc 49.

The concave surface 75 of the one-arm lever 74 linked to the housing 44 at 76 engages the outer side of an arm which pertains to the control lever 63 and carries a pressure roller 73. The radius of the curved surface 75 of the lever 74 corresponds approximately to twice the sweep radius of the outer mantle line of the pressure roller 73 so that the control lever 63 can equally well be actuated through the intervention of lever 74 in each of its possible positions relative to the housing 44. That side of the lever 74 which faces away from the curved surface 74 is engaged by a cam 77 of an actuating shaft 78 which is rotatably journaled on the housing 44 for rotation about an axis parallel to the axis of the threading die head. One end of shaft 78 which protrudes from the housing 44 has a radial arm 79 with a handle 80. By turning the actuating shaft 78 by means of the handle knob 80, the lever 74 is tilted toward the control lever 63 so that the control disc 49 is moved in the above-mentioned manner to its cutting position and is held in this position by the arresting device 59. The lever 74 and the cams 77 are protected within the housing 44.

That side of the abutment rollers 60, 61 which faces away from the control lever 63 has tiltably linked thereto in the cut 72 of the control disc 49 a disengaging lever 81, the pivot being indicated by the reference numeral 82. That side of lever 81 which faces away from the pivot 82 is provided with a cutout 83 having resting therein an abutment pin 84 connected to the control disc 49 so that the disengaging lever 81 is in both possible tilting directions limited by a single abutment 84. When the spacer member 62 occupies a position between the abutment rollers 60, 61, the disengaging lever 81 is tilted to its end position which is located toward the axis of the control disc 49. When the disengaging lever 81 is now tilted toward the spacer member 62 located between the rollers 60, 61 this spacer member will be pressed toward the lever 63 which means the spacer member is removed from between the abutment rollers 60, 61, so that the control disc 49 in view of the thrust of pressure spring 52 is turned in a direction counter to the direction of the arrow 69 until the bolt 53 abuts one end of the recess 51 and the cutting jaws 56 are in their starting position.

That side of the disengaging lever 81 which faces away from the abutment rollers 60, 61 is engaged by an end of the feeler pin 85 which is radially displaceable with regard to the axis of the threading die head in a corresponding bore of the control disc 49.

A runup abutment 86 with a corresponding cylindrical section 87 is axially displaceably guided on that side of the cutting jaws 56 which faces away from the chucks 5, 6. This abutment 86 is displaceably guided on the housing 44 or the control disc 45 at the axis of rotation thereof. The cylindrical section 87 of the abutment 86 is provided with a circumferential groove 88 one wall of which is conical. The mantle lines of this conical section converge from the abutment 86 away in a conical manner in such a way that a control surface 89 is formed which is engaged by the feeler pin 85 by means of its radially inwardly and conically designed end 90. The abutment 86 which is advantageously formed by a platform-shaped diametrical web, has a stair-shaped abutment surface in such a way that workpieces 25 of different diameters may abut against a pertaining abutment surface. The staging of the abutment surface may be selected in conformity with the German Standard DIN 2999 governing the length of threads on pipes of different diameter. When the workpiece 25 which during the thread cutting operation carries out an axial advancing movement, abuts against the abutment 86, the said abutment is moved by the workpiece 25 during its further movement. As a result thereof, the feeler pin 85 engaging the conical control surface 89 of the abutment 86 is moved radially outwardly while moving the disengaging lever 81 in the corresponding tilting direction so that in the above mentioned manner the spacer member 62 is pushed out from between the abutment rollers 60, 61 and the control disc 49 is by the pressure spring 52 tilted into its FIG. 3 position in which the cutting jaws 56 are moved radially outwardly which means disengage the workpiece 25. As a result thereof, automatically the thread cutting operation is interrupted when a certain preset thread length has been obtained.

One arm 92 of a two-arm lever 91 linked at 93 to the housing 44 is linked to the outside of the housing 44, said linkage point being located on that side of the cylindrical section 87 which faces away from the abutment 86. The other arm 94 of lever 91, which arm has one end 95 thereof fork-shaped, extends around that end of the actuating shaft 78 which faces away from the handle 80 and likewise protrudes from the housing 44. Shaft 78 has the said end provided with a broadened collar 69 which is formed by a sleeve. The actuating shaft 78 is displaceably mounted in the housing 44 in axial direction so that by displacement of the actuating shaft 78 in the direction of the arrow 97, the abutment 86 may by means of the lever 91 be displaced in precisely the same direction in which it is displaced by the oncoming workpiece 25. In the manner described above, the spacer member 62 is pushed out from between the abutment rollers 60, 61 so that the thread cutting operation can be interrupted manually independently of the position of the workpiece 25 with regard to the abutment 86 by axially displacing the actuating shaft 78 in the direction of the arrow 97. For purposes of displacing the actuating shaft 78, the radial arm 79 is tiltably journaled in a radial double-cone recess 98 of the actuating shaft 78 for tilting about an axis 99 perpendicular to the actuating shaft 78. In spaced relationship to the pivot axis 99, the radial arm 79 has on the housing 44 associated therewith a preferably adjustable bearing 100 so that by tilting the radial arm 79 in the direction of the arrow 101 toward the bearing 100, the actuating shaft 78 is tilted in opposite direction (arrow 75) whereby the cutting jaws 56 are returned from their cutting position. The device, for instance the support 3, may furthermore at a suitable location and at that side of the arm 79 which is located opposite to the bearing 100 be provided with a further preferably adjustable bearing 102. This last-mentioned bearing is with regard to the axis of the actuating shaft 78 located radially outwardly of the bearing 100 so that, when the radial arm 79 which pertains to the head 8 carrying out a displacement movement during the cutting operation moves against the bearing 102, the cutting jaws 56 will in the manner described above be moved outwardly by the tilting movement of the radial arm 79. This design is particularly suitable for cutting long threads which do not involve the abutment 86 but in the course of which the workpiece 25 can pass unimpededly through the housing 44. The abutment position of the abutment 86 is determined by a protruding extension 103 which in the abutment position of the abutment 86 will under the influence of a spring 104 engage the outside of the housing 44.

According to the embodiment shown in FIGS. 3 and 4, the actuating shaft 78 is provided at the bottom side of the housing 44 of the head 8 whereas the tommy screw 46 for the adjustment of the depth of the thread is arranged at the top side of the housing 44. As will be seen from FIG. 1, the actuating shaft 78a with the radial arm 79a carrying the handle 80a may also be provided on the top side of the housing 44a.

The guiding means 7 on the support 3 for the head 8, the pipe-cutting device 9 and the deburring device 10 are formed by a cylindrical rod 105 at one side and by a sliding and supporting surface 106 on the other side of the support 3. The rod 105 is at that end thereof which faces away from the chucks 5, 6 held in a supporting plate 107 by means of a tapered extension. Plate 107 is detachably in centered position connected to the end face of the support 3 by means of screws 108. A guiding sleeve 109 is displaceably guided on the cylindrical rod 105. Placed on said guiding sleeve 109 by means of an extension 110 is the housing 44, 44l of the thread cutting device 8. The said extension 110 may, in conformity with FIG. 3, be formed by a part which is detachable from the remaining portion of the housing 44 so that the thread-cutting device 8 can be removed from the support 3 without removing the sleeve 10 from the rod 105. The pipe-cutting device 9 is by means of a corresponding sleeve-shaped extension 111 placed upon the guiding sleeve 109. This sleevelike extension 111 rests on one side upon a collar 112 of sleeve 109 and on the other side rests against a spacer sleeve 113. This spacer sleeve 113 is located between the thread-cutting device 8 and the pipe cutting device 9 and is centered relative to the sleevelike extension 110 of the device 8 by a corresponding annular protrusion. The deburring device 10 likewise comprises a sleeve-shaped extension 114 by means of which it is placed as last part upon the guiding sleeve 109. The sleeves 110, 111, 113 and 114 are held in their respective positions by a spring ring 115.

The devices 8—10 are by means of corresponding sliding surfaces resting on the sliding surface 106 of the support 3. As will be seen from the thread-cutting device 8 of FIG. 4, the housing 44 and, more specifically, that side thereof which is located opposite to the sleeve-shaped extension 110 has a downwardly directed narrow sliding surface 116 which when the thread cutting device 8 is installed rests on the supporting and guiding surface 106 of the support 1.

It is, of course, to be understood that the present invention is, by no means, limited to the specific construction shown in the drawings but also comprises modifications, the invention being determined by the scope of the appended claims.

I claim:

1. An apparatus for machining pipes and the like, especially for thread cutting, deburring or cutting off and comprising in combination: a frame, rotary clamping means on the frame for receiving a workpiece and operable to drive the workpiece in rotation, machining head means on the frame reciprocable thereon in the direction of the axis of said clamping means and having cutting means therein including cutting means moveable thereon in a direction transverse to the axis of said clamping means, each said clamping means comprising a plurality of one-arm levers each pivoted at its radially outer end to said clamping means and having its radially inner end inclined to form workpiece engaging means, said clamping means further comprising a housing in which the respective one-arm levers are mounted, each lever having a rounded radially outer end and said housing having a rounded socket on its periphery for receiving each said rounded outer end, each said lever having an integral pin-shaped extension projecting laterally from both sides thereof, said extension being coaxial with said rounded radially outer end of the lever, recess-forming means in said housing loosely receiving said extension, said housing being drumlike and having a cover plate mounted on its open side, a control member coaxial with each clamping means and rotatable relative thereto, a recess in each one-arm lever between the ends thereof, and means on the control member pertaining to the respective clamping means engaging the said recess for tilting of said lever in response to rotation of said control member relative to said clamping means.

2. An apparatus in combination according to claim 1 in which said housing has a closed periphery, the control member for each clamping means being rotatably journaled on the sidewall of said housing thereof which is integral with the periphery of the housing, said recess in each one-arm lever being in the form of a slot extending radially to the axis on which the lever is pivoted to said housing, each control member comprising a cylindrical portion, and adjustable friction means carried by said frame and engaging said cylindrical portion.

3. An apparatus in combination according to claim 1 in which said clamping means comprise two axially spaced clamping devices both independently controlled and each adapted for driving engagement with a workpiece, and means interconnecting both said clamping devices for uniformly distributed turning moment during rotation as a unit.

4. An apparatus in combination according to claim 1, which includes first rodlike guiding means on the frame extending parallel to the axis of a workpiece being machined and pivotally supporting said machining head means, a second guiding means on said frame spaced from said first guiding means and presenting a sliding surface parallel to said workpiece axis, said machining head means including surface means for engagement with said sliding surface to support said machining head means in working position while permitting the machining head means to be tilted on said first guiding means out of working position, said machining head means comprising a cut off head and a threading head and a delivering head and each thereof being individually tiltable on said first guiding means, said machining head means including brushing means rotatable receiving said first guiding means.